United States Patent [19] [11] Patent Number: 4,902,216
Cunningham et al. [45] Date of Patent: Feb. 20, 1990

[54] EXTRUSION DIE FOR PROTRUSION AND/OR HIGH CELL DENSITY CERAMIC HONEYCOMB STRUCTURES

[75] Inventors: George M. Cunningham, Horseheads; Rodney I. Frost; Irwin M. Lachman, both of Corning, all of N.Y.

[73] Assignee: Corning Incorporated, Corning, N.Y.

[21] Appl. No.: 94,148

[22] Filed: Sep. 8, 1987

[51] Int. Cl.⁴ .............................................. B29C 47/30
[52] U.S. Cl. .................................. 425/463; 264/177.12
[58] Field of Search ............... 425/197, 463, 464, 466, 425/461, 462; 264/177.12, 211.11, 56, 177.16, 177.11; 428/116, 156

[56] References Cited

U.S. PATENT DOCUMENTS

| | | | |
|---|---|---|---|
| 1,601,536 | 10/1926 | Laskey | 425/464 |
| 3,038,201 | 6/1962 | Harkenrider | 425/197 |
| 3,406,435 | 10/1968 | Dietzsch | 425/96 |
| 3,702,227 | 11/1972 | Hureau | 425/466 |
| 3,755,204 | 8/1973 | Sergeys | 502/241 |
| 3,790,654 | 2/1974 | Bagley | 264/56-X |
| 3,824,196 | 7/1974 | Benbow et al. | 423/213.2 X |
| 3,837,783 | 9/1974 | Bagley | 425/464 |
| 3,888,963 | 6/1975 | Orso et al. | 264/211.11 |
| 3,929,951 | 12/1975 | Shibata et al. | 264/177.12 X |
| 3,941,550 | 3/1976 | Marion | 425/463 |
| 4,118,456 | 10/1978 | Blanding et al. | 264/177.16 X |
| 4,168,944 | 10/1979 | Morikawa et al. | 425/464 |
| 4,235,583 | 11/1980 | Reed | 425/464 |
| 4,242,075 | 12/1980 | Higuchi et al. | 425/462 |
| 4,259,057 | 3/1981 | Abe et al. | 425/463 |
| 4,290,743 | 9/1981 | Suzuki | 264/177.12 X |
| 4,298,328 | 11/1981 | Frost | 425/461 X |
| 4,298,564 | 11/1981 | Higuchi et al. | 264/177.12 |
| 4,343,604 | 8/1982 | Minjolle | 425/464 X |
| 4,354,820 | 10/1982 | Yamamoto et al. | 264/177.12 X |
| 4,373,895 | 2/1983 | Yamamoto et al. | 425/461 |
| 4,384,841 | 5/1983 | Yamamoto et al. | 425/461 |
| 4,402,870 | 9/1983 | Schurmans | 428/156 |
| 4,465,454 | 8/1984 | Duerr et al. | 425/464 X |
| 4,465,652 | 8/1984 | Lentz | 264/177.12 |
| 4,468,365 | 8/1984 | Corbett et al. | 264/177.12 |
| 4,550,005 | 10/1985 | Kato | 264/177.12 |
| 4,722,819 | 2/1988 | Lundsager | 264/177.11 |
| 4,767,309 | 8/1988 | Mizuno et al. | 425/461 |
| 4,802,840 | 2/1989 | Fukuda et al. | 425/464 |

FOREIGN PATENT DOCUMENTS 191982 8/1986 European Pat. Off. .
528761 12/1975 Japan .
57-178712 11/1982 Japan ............................. 264/177.12

Primary Examiner—Richard L. Chiesa
Attorney, Agent, or Firm—Clinton S. Janes, Jr.; Richard N. Wardell; Maurice M. Klee

[57] ABSTRACT

Secondary discharge slots are cut into the face of newly made or used extrusion dies such that the secondary discharge slots communicate transversely and longitudinally with primary discharge slots but do not communicate with the feed holes. The novel extrusion die arrangement is set forth for the production of ceramic honeycomb structures which produce a greater number of cells per square inch, protrusions on the cell walls, or a combination of both dependent upon the Primary Slots' Volume to Secondary Slots' Volume ratio. The secondary discharge slots can produce honeycomb substrates with much greater surface areas, using an extrusion die with a significantly reduced number of feed holes and a greater number of discharge slots.

5 Claims, 9 Drawing Sheets

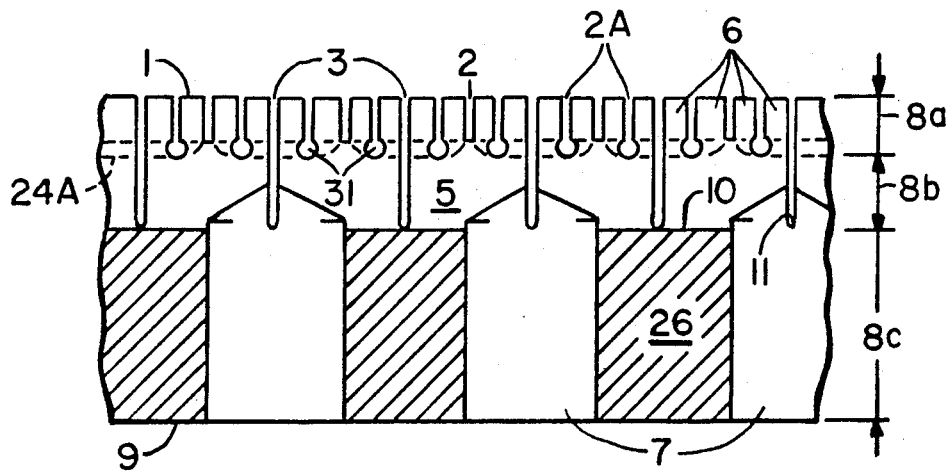
Fig. 11
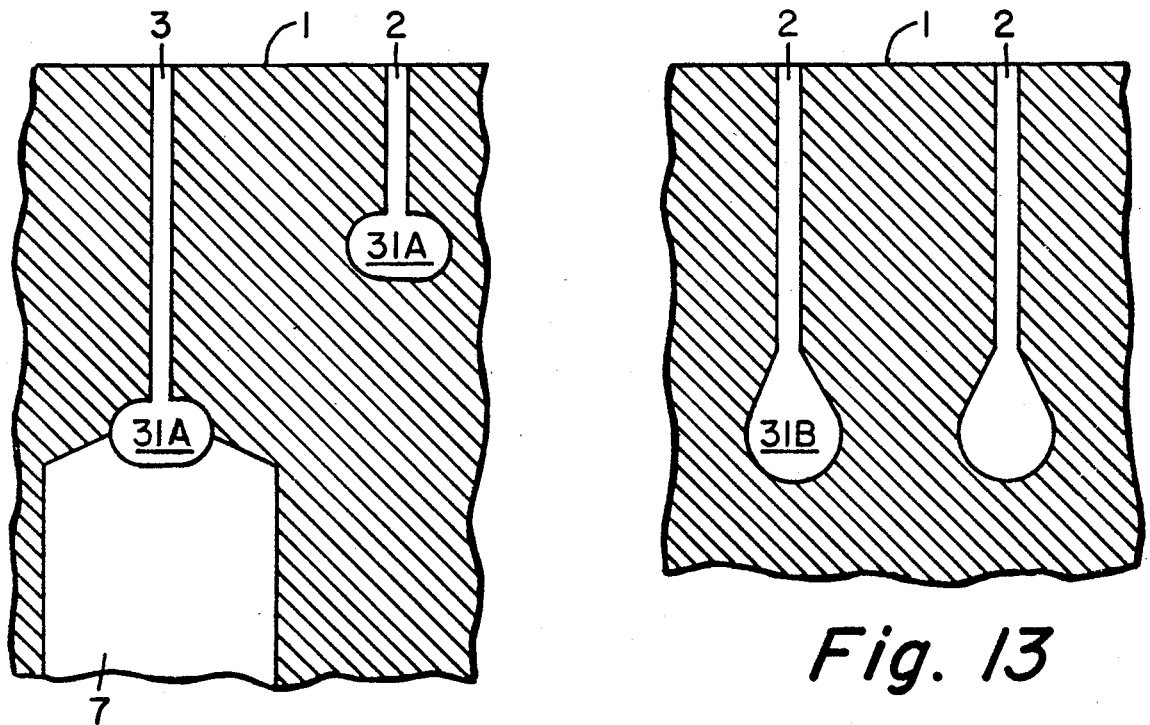
Fig. 12
Fig. 13

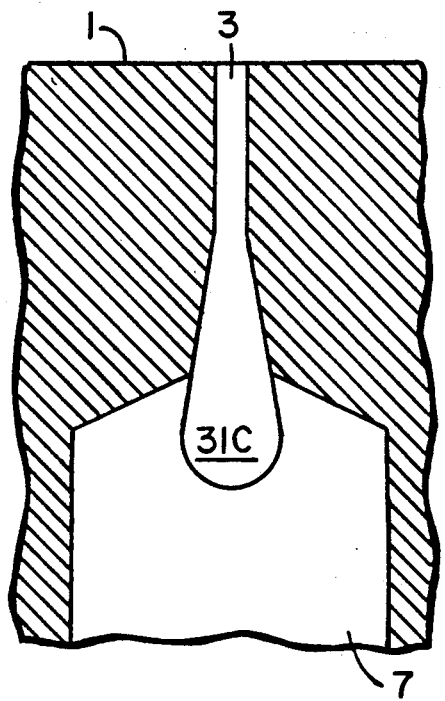
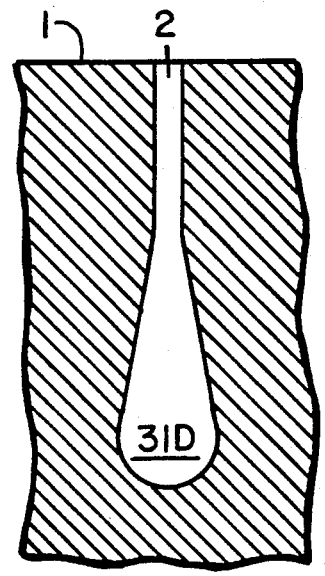
Fig. 14
Fig. 15
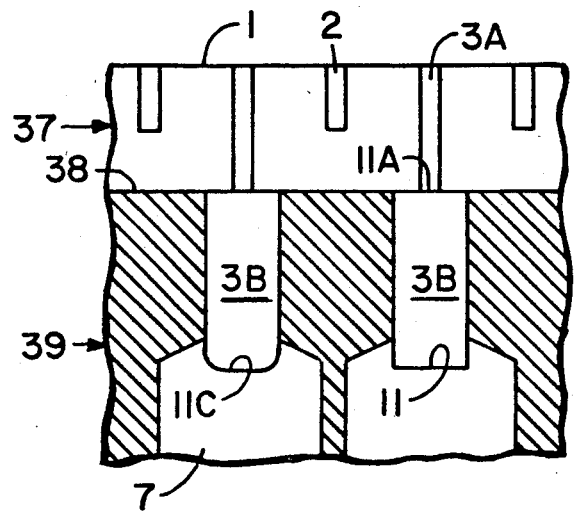
Fig. 16

EXTRUSION DIE FOR PROTRUSION AND/OR HIGH CELL DENSITY CERAMIC HONEYCOMB STRUCTURES

BACKGROUND OF THE INVENTION

Extrusion dies have been found useful for the production of ceramic honeycomb structures for use as catalytic converters in the exhaust stream of internal combustion engines. As the use of ceramic honeycomb structures has broadened to catalytic converters in a wider range of engine types and in stationary emission control, to chemical process structures, to refining structures, and to alternative catalytic systems and uses, the need for ceramic honeycomb structures with greater cell density per unit of transverse cross-sectional area and/or greater geometric surface area per cell has strained the usefulness of the current extrusion die technology. The beneficial action of catalytic converters is a function of the surface area available to the exhaust stream for interaction with the noxious output of internal combustion engines. Significant advances in ceramic honeycomb structure technology may thereby be achieved by increasing the cell density (per square inch or centimeter) of the structure or by increasing the surface area per cell.

Formation of the extrusion die defines the subsequent geometry and plurality of longitudinally extending cells possible for ceramic honeycomb structure. Therefore, the limits of extrusion die technology necessarily limits the ceramic honeycomb structure technology.

The prior art contains various types of extrusion dies. U.S. Pat. No. 3,790,654 discloses a machined extrusion die formed from a unitary die block. A plurality of machined or cut, stacked plates, with their longer dimensions extending in the longitudinal flow direction through the die, are disclosed in U.S. Pat. Nos. 3,790,654 and 4,465,652 as a laminated blade extrusion die to be used to produce the honeycomb structure. U.S. Pat. No. 4,550,005 discloses a compound die (i.e. a type having two or more bonded pieces whose longer dimensions extend transverse of the longitudinal flow direction through the die) of the compound feed type with a replaceable perforated plate attached on the inlet portions of feed passageways. Common to all of these extrusion dies are feed holes which communicate with all of the intersecting or crisscrossing grid-like discharge slots.

U.S. Pat. Nos. 4,298,564 and 4,354,820 show compound dies of the compound slot type with intersecting wider slots connecting between the feed holes and the intersecting discharge slots. Each wider slot is fed by feed holes. Each narrower discharge slot is longitudinally fed directly only by one of the wider slots.

Japanese Unexamined Patent Application Publication 52-8761 shows a feed of the inner ends of the discharge slots only through separated lateral connecting passages extending from the inner ends of the feed holes and ending at the inner ends of the slots.

All of these prior art die designs (with the one limited exception) fundamentally rely on feed holes longitudinally aligned and in communication with all of the discharge slots. The prior art teaches the need for a feed hole which is functionally related to discharge slots by feeding material to each discharge slot to insure proper batch flow to form fully knitted honeycomb structures. The relationship of the large number of holes to total lateral slot expanse in FIG. 8 of U.S. Pat. No. 4,259,057 clearly suggests, in light of the other functional teaching, that only a limited deviation from the fundamental prior art teaching is permissible in that regard. Thus, as the number of slots in a die is increased in order to increase the cell density of products produced with a die, the prior art teaching requires a commensurate increase in feed holes aligned therewith to maintain proper flow.

SUMMARY OF THE INVENTION

The present invention is directed to a new concept in an extrusion die for forming honeycomb structures with transversely intersecting, interconnected or interlaced cell walls from extrudable material. The concept has the advantage of an additional degree of freedom in die design and it radically alters the relationship between feed holes and discharge slots. The new die provides a die with secondary discharge slots, usually crisscross or grid-like, fed directly only by the intersecting or crisscrossing primary discharge slots (i.e. not by the feed holes), which primary slots alone correspond to the slots of prior art die designs. Consequently, the new die concept affords the freedom to add a substantial number of discharge slots in the form of secondary slots without increasing the number of feed holes in the die and still maintains the proper batch flow to extrude material through such die to form products with higher cell density and/or higher geometric surface area. The essence of the invention is the change in the mechanism of delivery of a substantial part of the extrudable batch material, which results in a multitude of economies in die designs.

One aspect of the invention comprises a die body having an inlet face, an outlet face, and a plurality of feed holes extending within the body from the inlet face toward the outlet face. The invention is characterized by feed holes which are directly interconnected only with each of a plurality of transversely crisscrossed, grid-shaped or interconnected primary discharge slots defined by a plurality of primary core members or pins of the body and extending within the body from the outlet face toward the inlet face, with inner end portions of the feed holes communicating longitudinally and transversely in overlapping manner with inner end portions of the primary discharge slots. The invention is further characterized by the improvement comprising secondary discharge slots, usually interconnected, crisscrossed or grid-shaped extending within the primary core members from the outlet face toward the inlet face and into direct transverse communication only with themselves and the primary discharge slots (so as to provide combined transverse and longitudinal flow therebetween). The secondary discharge slots divide the primary core members into secondary core members or pins defining the secondary discharge slots. The secondary discharge slots extend toward the inlet face but do not directly communicate with the feed holes. The secondary discharge slots may be wider than, narrower than or equal in width to the primary discharge slots, or a combination thereof. The secondary discharge slots may also have a depth that is shorter than, longer than or equal in length to the depth of the primary discharge slots, or a combination thereof. Moreover, the widths and/or depths of the secondary slots dividing each primary core member may differ from each other or from at least one other of them as desired. The surprising result of such an extrusion die configuration is the capability for increasing the surface area of honeycomb structures by producing protrusions or protuberances (partial additional cell walls) on the cell walls, or by causing full knitting of additional cell walls for higher cell density, or by a combination of both.

The invention may also be characterized by a mechanism of extrusion which requires at least two extrusion zones, but most preferably comprises three extrusion zones when the secondary slots extend inwardly from the outlet face a shorter distance than the primary slots. The three zones comprise a feed hole zone, an intermediate slot zone, and a terminal slot zone. The feed hole zone begins at the inlet face and ends at a transverse collection boundary formed by the inner ends of the primary discharge slots where the feed holes begin to overlap in communication with the primary discharge slots. The intermediate slot zone begins where the feed hole zone ends and ends at a transverse collective boundary formed by inner ends of the secondary discharge slots. The terminal slot zone begins where the intermediate slot zone ends and ends at the outlet face. The intermediate slot zone does not occur where the secondary slots extend inwardly from the outlet face at least equidistant to the primary slots. In this two zone case, the terminal slot zone begins where the feed hole zone ends.

The individual primary slot width and/or depth in the intermediate slot zone may be larger than, smaller than, or equal to the individual primary slot width and depth in the terminal slot zone, or may be any combination thereof. In a case where a primary slot has multiple longitudinal and/or lateral dimensions (e.g. different widths and/or depths for different sections of its length), the inner end portion of the primary discharge slot with one of the multiple dimensions is defined to be contained within the boundaries of the intermediate slot zone and the outer end portion of the individual primary discharge slot with the other of the multiple dimensions is defined to be within the boundaries of the terminal slot zone to perform the same function as a secondary discharge slot.

It is further contemplated that a plurality of intermediate slot zones may be added to the die to effect the end of the instant invention.

The technical effect of the three zone concept becomes apparent in the invention when volume ratios are to be calculated between the aggregate volumes of the primary discharge slots and the aggregate of the volumes of secondary discharge slots to determine the configuration of the resulting extruded honeycomb product. Such ratios, which are functionally related to the viscosity of the extruded material, are designed to produce either full knitting or formation of all cell walls, protrusions on cell walls, or a combination of both by material discharged from the secondary slots. When this volume ratio of primary slots' volume to secondary slots' volume is a certain minimum value related to a certain viscosity of the extruding material flowing through the die, the secondary slots form only additional, fully knitted or formed, cell walls, thereby providing more cells per unit transverse cross-section of the resultant extruded honeycomb structure than would otherwise be provided by only the primary slots. Conversely, when such volume ratio is a certain lower maximum value also related to such certain viscosity, the secondary slots form only partial additional cell walls that are protrusions or protuberances on and longitudinally along the fully knitted cell walls formed by the primary slots. With the volume ratio between these minimum and maximum values for the same certain viscosity, the secondary slots will form a combination of some additional fully knitted cell walls and some protrusions, the nature of which combination can be varied as desired by varying the noted volume ratio between the aforesaid minimum and maximum values for the same certain material viscosity.

The novelty of the invention is further exhibited by the ease with which existing die configurations may be incorporated into the new die arrangement. The current invention can provide increased discharge slots without the cost or need for machining additional feed holes. This is extremely useful for single unit extrusion dies since the machining effort on the inlet face of the die can be reduced by 75% as now practiced in the art. Heretofore a common minimum of one-half or one feed hole is required for each 4 proportionally associated discharge slot segments forming and extending from an intersection of slots, e.g. as in FIGS. 4-5 of U.S. Pat. No. 3,790,654. The secondary discharge slots herein disclosed are fed the batch material by the primary discharge slots which can reduce the earlier ratio of 0.125 or 0.25 feed holes to total of proportionally associated primary and secondary discharge slot segments associated with each to a lesser ratio, e.g. 0.03125 or 0.0625, respectively.

A further advantage to the reduction of the number of required feed holes is a significant decrease in the batch flow impedance over that practiced in the art today since the diameter of the feed holes can be larger without loss of rigidity of the die. As the need for higher cell density substrates has evolved, the flow impedance has risen commensurately with die complexity, which impacts the production rate of the honeycomb structure. The new die configuration is less complex, which may help increase the production rate due to lower flow impedance and which does help decrease the machining expense of the die.

The novel secondary discharge slots can be cut or designed into laminated, compound, or single block (unitary) extrusion dies. The preferred embodiment is the single block extrusion die.

A systematic variation of the length of the discharge slots may be further obtained by bowing or warping the die outlet face to be convex or concave or otherwise contoured and/or by varying the depth of cutting of the secondary discharge slots into the outlet face to form a convex, concave or otherwise contoured transverse collective boundary of the inner ends of the secondary discharge slots. The effect of this technique is the same as varying the volume (or width) of cut from slot to slot without bowing or warping since a variation, transversely across the die, of primary slot to secondary slot volume ratio is obtained. It is also contemplated that such varying of slots' lengths can be combined with varying widths of the slots, e.g. wider when longer.

The honeycomb product produced from the new die configuration is dependent upon the viscosity of the extruded material. As the viscosity of the extruding material increases, the tendency for knitting is greater through a die which would produce protrusions on a lower viscosity material and vice versa. Relative viscosity of extrudable batch material flowing through a die is typically and conveniently determined indirectly by the extrusion pressure that has to be exerted on a batch to flow it through a die to form a honeycomb product, e.g. the pressure (customarily referred to as "pre-extrusion pressure") in a preliminary extrusion through a "noodle" die having holes but no slots for homogenizing the batch (see homogenizer 32 in U.S. Pat. No. 3,888,963). The present specific volume ratio relationships in the examples were determined using a batch of clay, talc and alumina with customary organic binder and lubricant plus plasticizing water as the extruded material which exhibits a preextrusion pressure range between 1350 and 1700 psi.

Of course, the capability of an extrudable batch material to flow through a honeycomb-forming die is known to be related to some necessary differential between the maximum particle size of the batch and the width of the discharge slots of the die. In other words, it is known the maximum particle size has to be substantially less than the width of the die slots through which the batch has to pass. Exemplary illustrations of suitable differentials are: batch material with maximum particle size of about 200 mesh (0.074 mm) extrudes through die slots of 8 mils (0.2 mm) width; and batch material with maximum particles size of about 120 mesh (0.125 mm) extrudes through die slots of 26 mils (0.66 mm) width, but not through die slots of 8 mils (0.2 mm) width. An ordinary skilled worker in the extrusion of honeycomb structures from such dies knows how to readily determine and select a suitable batch maximum particle size for any desired die slot width, especially with the foregoing exemplary illustrations as a guide.

A further object of the invention is to provide an extrusion die capable of producing a ceramic honeycomb structure with 2400 or more cells per square inch. The 2400 cells per square inch die can be produced new or from a 600 cells per square inch used extrusion die.

A further object of the invention is to provide an extrusion die wherein secondary slots are formed unidirectionally, essentially bisecting the primary core members or dividing a primary core member into two secondary core members.

The die of the present invention disclosed and claimed herein can be used for extruding any suitably extrudable material, such as particulate material, that can be extruded and rigidified into a useful honeycomb shaped product. Such materials include ceramics, cermets, metals, glass-ceramics, glasses, resins, polymers, organic plastics and the like.

In a further embodiment of the invention, the inner end portions of the primary and/or secondary discharge slots are provided with enlarged extensions constituting feed reservoirs extending along and communicating with those inner ends. The reservoirs can have any suitable transverse shape such as circular and/or oval, but an especially desirable and novel form of such shape is tear-drop. The latter tear-drop shape of reservoir also forms novel invention subject matter in combination with the earlier honeycomb extrusion dies without crisscrossing secondary slots.

BRIEF DESCRIPTION OF THE DRAWINGS

FIG. 10b is a partial schematic frontal view of the outlet face of the extrusion die of FIG. 10a.

FIG. 11 is a partial cross-sectional view of a die similar to the die of FIG. 2 but containing more than one secondary discharge slot between adjacent primary discharge slots.

FIG. 12 is a partial cross-sectional view of a die of the present invention with an oval form of reservoir at the inner ends of the slots.

FIG. 13 is a partial cross-sectional view of one teardrop form of reservoirs for the present invention.

FIGS. 14 and 15 are partial cross-sectional views of another tear-drop form of reservoirs that can be used in the present invention.

FIG. 16 is a partial cross-sectional view of another compound extrusion die according to the present invention.

DESCRIPTION OF THE PREFERRED EMBODIMENTS

Figure 2:
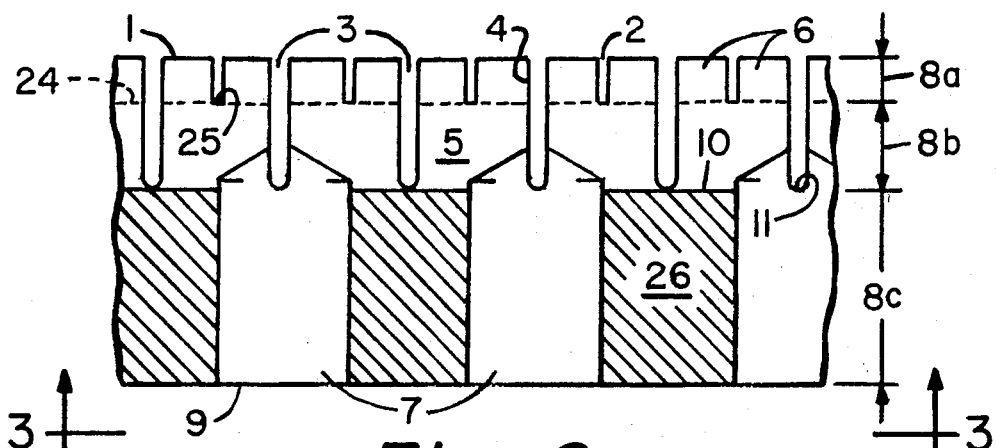
FIG. 2 is a partial cross sectional view, taken along line 2—2 of FIG. 1.
Figure 1:
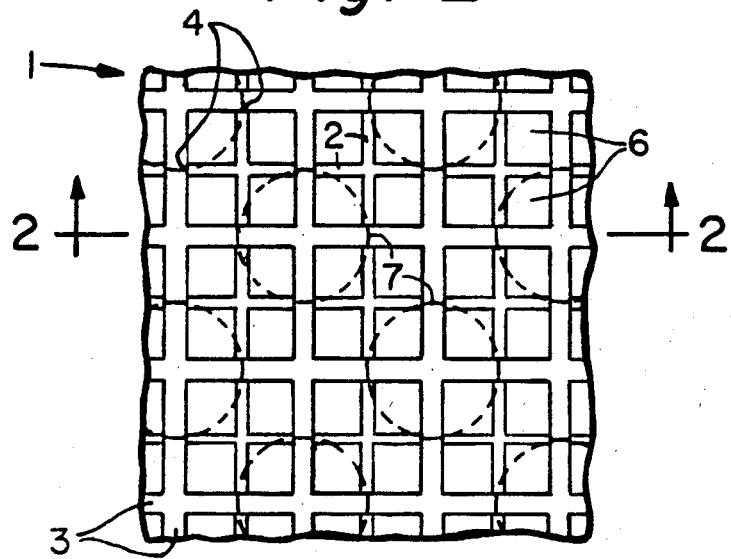
FIG. 1 is a partial frontal view of the outlet face of one embodiment of the extrusion die of the present invention.
Figure 3:
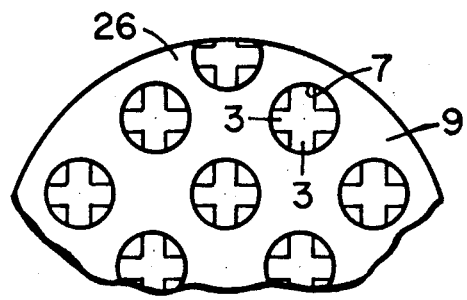
FIG. 3 is a partial frontal view of the inlet face of the extrusion die shown in FIG. 1.

In FIGS. 1-3 the outlet face 1 is shown comprising a plurality of interconnected, grid-shaped, crisscross, secondary, discharge slots 2 and a plurality of interconnected, crisscross, grid-shaped, primary, discharge slots 3 with both types of slots extending inwardly from the outlet face 1. The primary discharge slots 3 communicate and interconnect with and feed the secondary discharge slots 2 within the area of the primary discharge and secondary discharge slot intersections 4. Two crisscrossing pairs of adjacent parallel primary discharge slots 3 produce each square primary core member or pin 5, which extends inwardly from the outlet face 1 toward the inlet face 9. Conversely, the slots 3 are defined by the pins 5. A portion of the primary core member or pin 5 is divided by the secondary discharge slots 2, which produce square secondary core members or pins 6 that define the secondary discharge slots 2. The primary discharge slots 3 are fed by and in communication with a plurality of feed holes 7 originating at the inlet face 9, which holes 7 directly communicate and overlap with the inner ends 11 of the primary discharge slots 3. While primary slots 3 are illustratively shown to be wider than secondary slots 2 (whereby such slots respectively form cell walls in extruded products of differing thickness), both slots 2 and 3 can be made with identical widths for producing products whose thin cell walls have one generally uniform thickness dimension. In some cases, due to differences in the physical properties of the extrudate, the secondary slots have to be made larger than the primary slots for the extrusion of uniform product walls.

When it is desired to produce honeycomb structures with cells of rectangular transverse cross-sectional shape other than square, the secondary pins and perhaps also the primary pins can be formed with a corresponding transverse cross-sectional shape. The feed holes are separated by a base portion 26 of the die in the feed hole zone. As shown in FIG. 2, the terminal slot zone 8a ends at the outlet face 1 and begins inwardly along the transverse collective boundary or plane 25 (shown as phantom dashed line) of the inner ends 24 of slots 2. The intermediate slot zone 8b ends inwardly at the boundary 24 where the terminal slot zone 8a begins, and zone 8b begins inwardly at the transverse collective boundary or plane 10 of the inner ends 11 of the primary discharge slots 3, where the feed hole zone 8c ends. Zone 8c begins at the inlet face 9.

Figure 4:
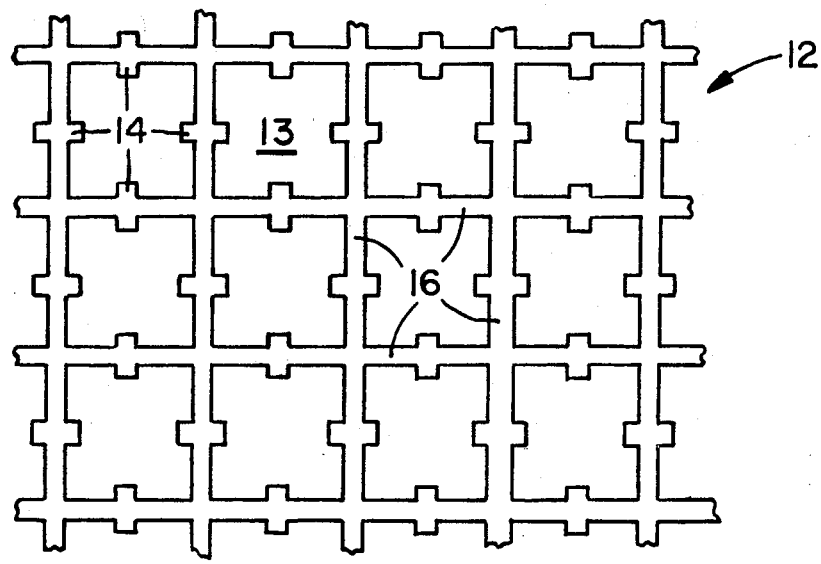
FIG. 4 is a partial frontal view of an open end of a honeycomb structure with protrusions made with a die of the type shown in FIG. 1.

FIG. 4 shows a representative product made with an extrusion die having an aggregate primary slot volume to aggregate secondary slot volume ratio of 3.83. The honeycomb structure 12 is shown as a plurality of unit cells 13 defined by walls 16 with protrusions 14 entering from and extending longitudinally along the side walls 16 of each unit cell 13. Walls 16 were formed by primary discharge slots 3 whose width was the same as the width of secondary discharge slots 2 that formed protrusions 14.

Figure 5:
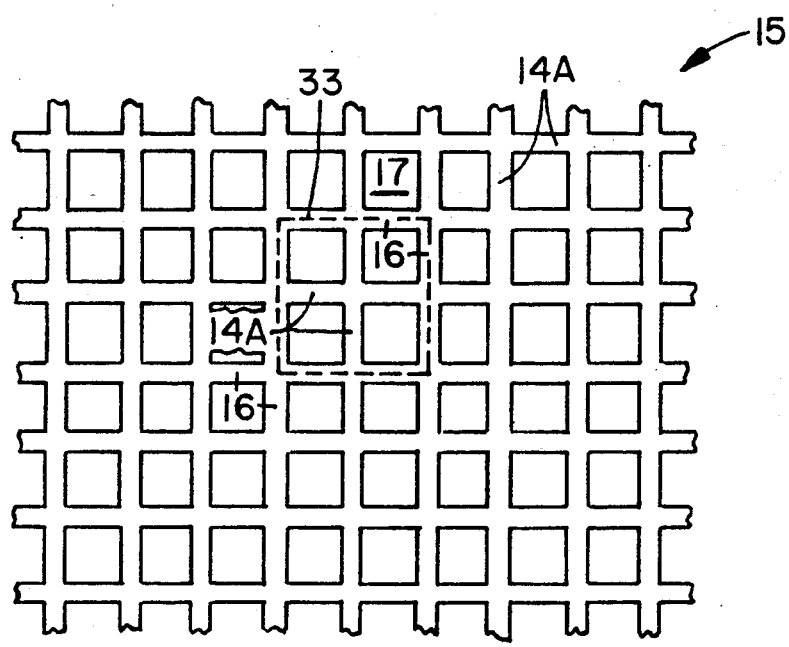
FIG. 5 is a partial frontal view of an open end of a honeycomb structure with knitting of complete cell walls as made with a die of the type shown in FIG. 1.

FIG. 5 shows a representative product made with an extrusion die having an aggregate primary slot volume to an aggregate secondary slot volume ratio of 1.58. The honeycomb structure 15 is shown as a plurality of unit cells 17 defined by cell walls 16 and 14A. Walls 16, like those in FIG. 4, were formed by primary discharge slots 3 whose width was the same as the width of secondary discharge slots 2 that formed fully knitted walls 14A.

The basic difference between the products of FIGS. 4 and 5 can be appreciated by comparing a unit cell 13 in FIG. 4 with four unit cells 17 in FIG. 5, such as those circumscribed by the rectangular dotted line 33 in FIG. 5. Instead of the protrusions 14 in FIG. 4, fully knitted walls 14A in FIG. 5 provide four smaller unit cells 17 in place of one unit cell 13 as in FIG. 4. This difference is the result of the differing ratios of aggregate secondary slots' volume to aggregate primary slots' volume of the dies used to make such products.

Figure 6:
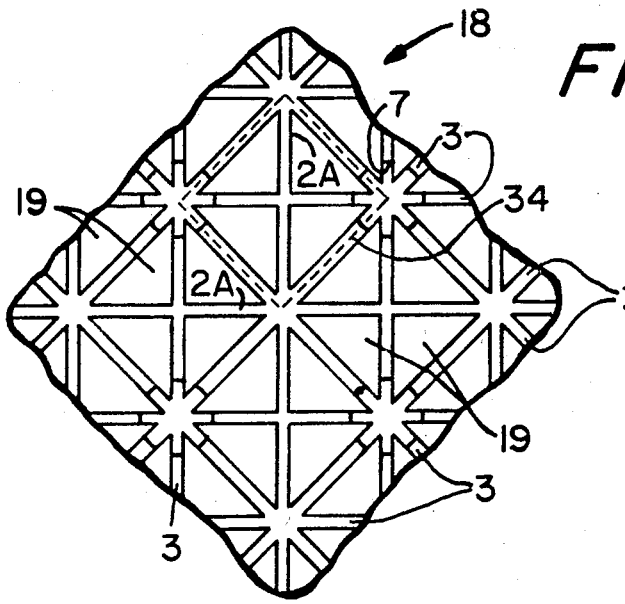
FIG. 6 is a partial frontal view of the outlet face of another extrusion die of the present invention.

FIG. 6 shows a die outlet face configuration 18 for the production of honeycomb structures with four triangular unit cells in place of two triangular unit cells that would otherwise result in the absence of secondary discharge slots 2A. Circumscribed by the square-shaped dotted line 34 in FIG. 6 are two primary core members or pins of triangular cross-section bounded by five primary discharge slots 3 (four primary slots coinciding with line 34 and one secondary slot crossing in a line pattern oriented at 45° to line 34). Each primary core pin is bisected by a secondary discharge slot 2A to form two secondary core members or pins 19 of triangular cross-section. The pins 19 and their bounding slots 2A, 3 form the triangular unit cells in the extruded product. Only the primary discharge slots 3 directly communicate with feed holes 7.

Figure 7:
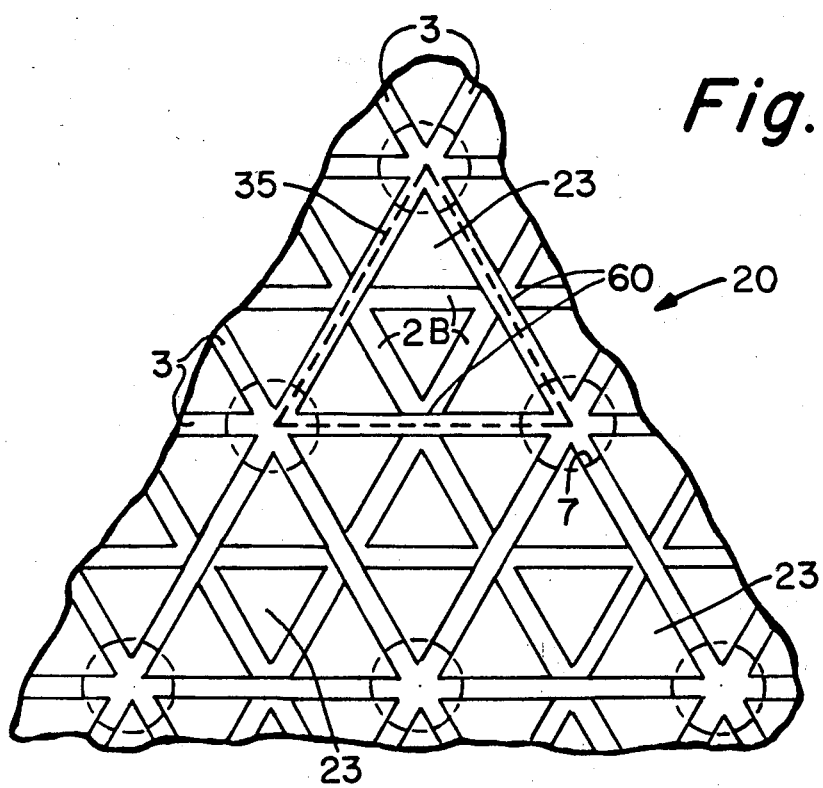
FIG. 7 is a partial frontal view of the outlet face of another extrusion die of the present invention.

FIG. 7 shows a die outlet face configuration 20 for the production of triangular unit cell honeycomb structure. The secondary triangular core members 23 are produced by quadrisecting triangular primary core members or pins of used or new dies with secondary discharge slots 2B. The line segments 60 indicate the shallower depths that may be associated with secondary slots whereas primary slots communicate with the feed holes. This die configuration produces honeycomb structures with equilateral triangular cells. The triangular dotted line 35 in FIG. 7 circumscribes a triangular primary pin bounded by three crisscrossing primary discharge slots 3 directly communicating with three adjacent feed holes 7. Three crisscrossing secondary discharge slots 2A are cut across each triangular primary pin inwardly from its outlet face end to form four adjacent equilateral triangular core members 23, whereby the new die configuration can capably produce four times the number of triangular honeycomb unit cells than would otherwise result in the absence of secondary slots 2A.

Figure 8:
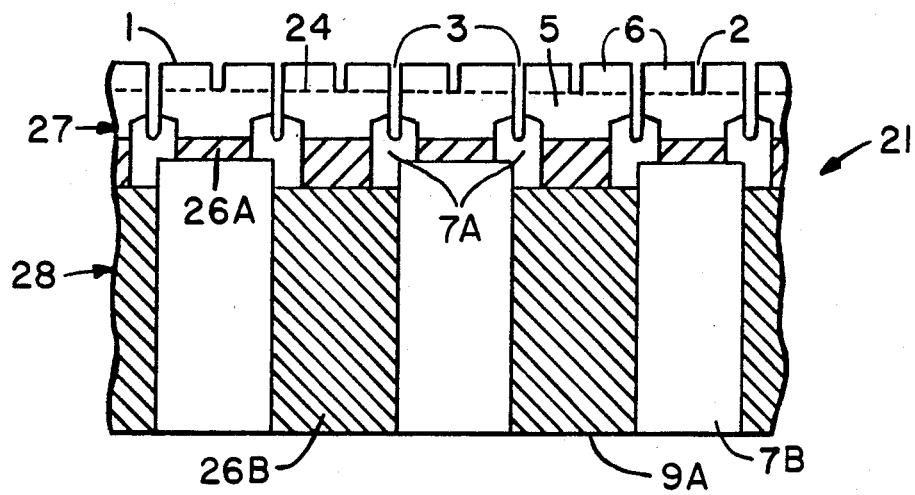
FIG. 8 is a partial cross-sectional view of a compound (feed) extrusion die according to the present invention.

FIG. 8 shows a compound die 21 comprised of bonded plates 27 and 28. Plate 27 contains outlet face 1, base portion 26A with smaller feed holes 7A, primary pins 5 defining primary discharge slots 3, and secondary pins 6 defining secondary discharge slots 2. Plate 28 contains inlet face 9A and base portion 26B with larger feed holes 7B. Each larger feed hole 7B is arranged to longitudinally overlap and feed two or four smaller feed holes 7A, e.g. in known manner as disclosed in U.S. Pat. Nos. 4,118,456 and 4,465,454. The basic advantages of such compound die and the basic mechanism of its operation are the same as for the unitary die shown in FIGS. 1–3.

Figure 9:
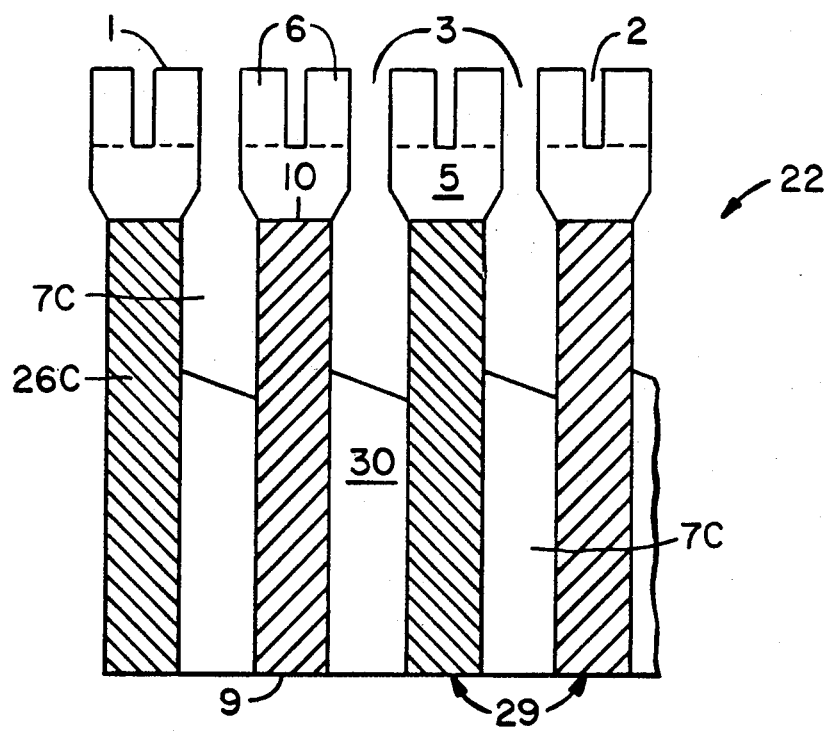
FIG. 9 is a partial cross-sectional view of a laminated (blade) extrusion die according to the present invention.

FIG. 9 shows a laminated blade die 22 comprising a plurality of die blades 29 of the type shown in U.S. Pat. No. 4,465,652. Each blade 29 comprises a base portion 26C with rib or channel dividers 30 to define feed holes or channels 7C, and primary pins 5 with secondary pins 6 defining secondary discharge slots 2. With the blades 29 assembled together, pins 5 define primary discharge slots 3. The basic advantages of such laminated die and the basic mechanism of its operation are the same as for the unitary die shown in FIGS. 1–3.

The calculation of the volume ratio of the aggregate primary slot volume to the aggregate secondary slot volume for dies of the present invention is illustrated below in connection with FIGS. 10a and 10b. However the general principles of such calculation as revealed below are readily applied by the skilled person to a similar calculation of the volume ratio for any other design of slots and pins in a die of the present invention, such as those with primary and/or secondary pins having a transverse cross-sectional shape of rectangle other than a square and those shown in FIGS. 6–7.

A convenient way of calculating the volume ratio is to first select a representative slot-containing portion of the die that consists of the smallest unit of repetitive slot-and-pin configuration occurring in the die. In FIGS. 10a and 10b, secondary pins $P_1$-$P_2$-$P_3$-$P_4$, together with the proportionally associated portions of adjacent primary slots 3 and with the mutually bounded portions or segments of secondary slots 2 are the smallest unit of repetitive slot-and-pin configuration in the illustrated die having primary and secondary pins 5,6 of square transverse cross-section where slots 2 divide each primary pin 5 into four secondary pins 6. That smallest unit is circumscribed in FIG. 10b by the dotted line 36. Since pins $P_1$-$P_2$-$P_3$-$P_4$, relative to other surrounding pins 6, are proportionally associated with the adjacent one-half of the four surrounding segments of primary slots 3, the dotted line 36 is on the centerline of those surrounding segments.

Figure 10A:
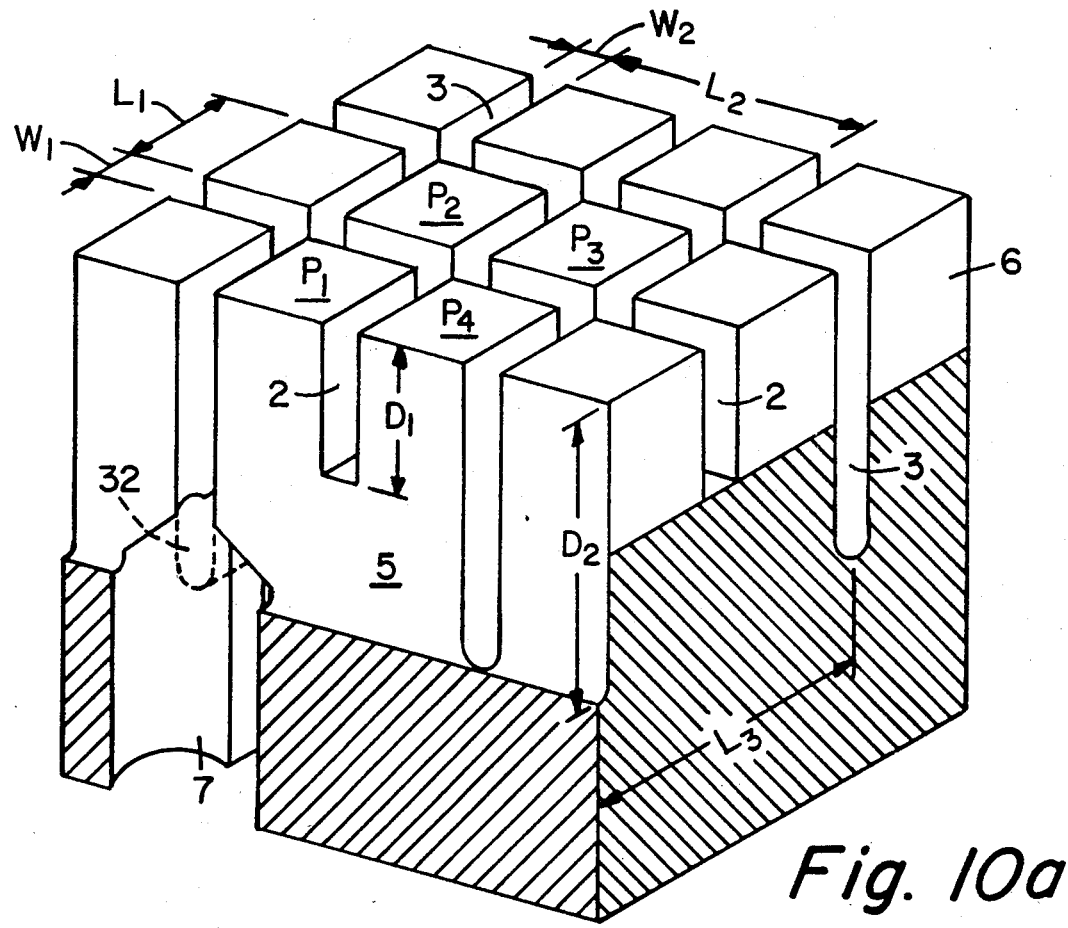
FIG. 10a is a partial cross-sectional three dimensional view of the die in FIG. 1.
Figure 10B:
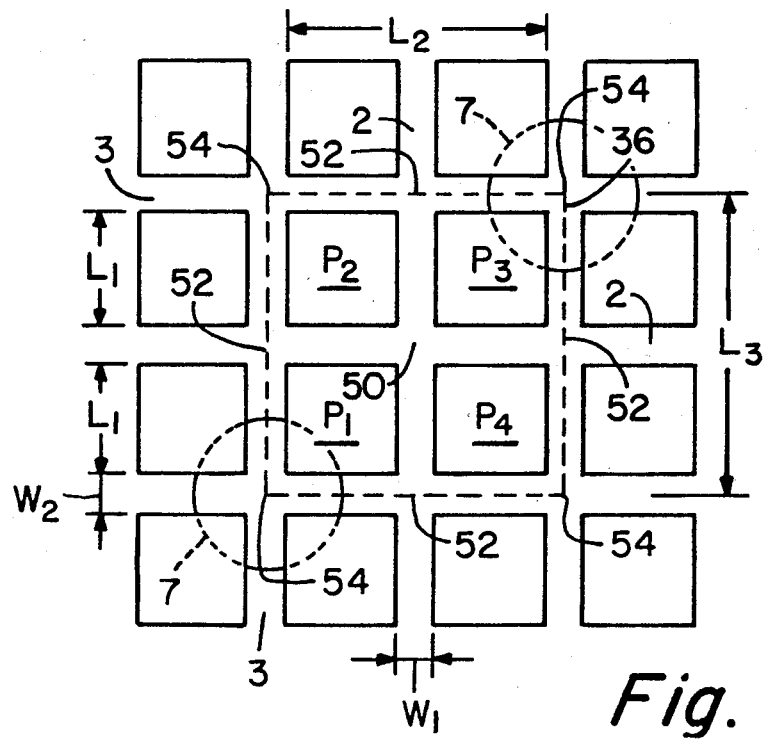

In FIGS. 10a and 10b: $D_1$ is the depth from the outlet face of each secondary slot 2; $D_2$ is the depth from the outlet face of each primary slot 3; $L_1$ is the length of a side of each secondary pin 6; $L_2$ is the length of a side of each primary pin 5 (or the combined width of two secondary pins 6 and of one secondary slot 2); $L_3$ is the length of each side of the smallest unit circumscribed by dotted line 36; $W_1$ is the width of each secondary slot 2; and $W_2$ is the width of each primary slot 3.

For purposes of calculating the slots' volume ratio: (1) the inner ends of the slots 2,3 are assumed to be flat or squared off since any modest rounding, tapering or other contouring of the inner ends of these slots represents an inconsequential effect relative to the volume ratio calculation, and (2) the volume of the primary slots 3 is assumed to include the overlapping projection 32 (shown by dotted lines in FIG. 10a) of such slots 3 extending longitudinally into the inner portion of holes 7.

Consequently the respective aggregate slot volumes in the smallest unit circumscribed by dotted line 36 are defined by the following equations:

Primary Slot Volume = $L_2W_2D_2 + L_3W_2D_2$:
Secondary Slot Volume = $2L_1W_1D_1 + L_2W_1D_1$.

The slots' aggregate volume ratio is then defined as $$\text{Volume Ratio} = \frac{\text{Primary Slots' Volume}}{\text{Secondary Slots' Volume}}.$$

Smallest units of repetitive slot-and-pin configuration in FIGS. 5–7 are circumscribed respectively by dotted lines 33-34-35. Although FIG. 5 is of the extended structure, it nevertheless symbolizes the slot and pin configuration that formed it.

An alternative way to calculate the volume ratio distinguishes volume portions within the primary discharge slots. As described above, the end volume portion of the primary discharge slot is included within the terminal discharge slot zone 8a and this volume portion, for purposes of calculation and analysis, is treated separately from the volume portion of the intermediate discharge slot zone 8b. The reason for the separate treatment of the end volume portion of the primary discharge slot is that, for the determination of die performance to produce extruded structures with protrusions, higher cell density knitting, or a combination thereof, the transverse lateral slot communication and interrelatedness of the discharge slots within the terminal discharge slot zone 8a is pivotal. Changes in the volume portion of the discharge slots within zone 8a can be made independently from the volume of the primary discharge slot portion within zone 8b. Therefore, a meaningful predictive volume ratio may be calculated by dividing, for a smallest repetitive unit in the die, the aggregate slots' volume in zone 8a by the aggregate slots' volume in zone 8b.

Figure 17:
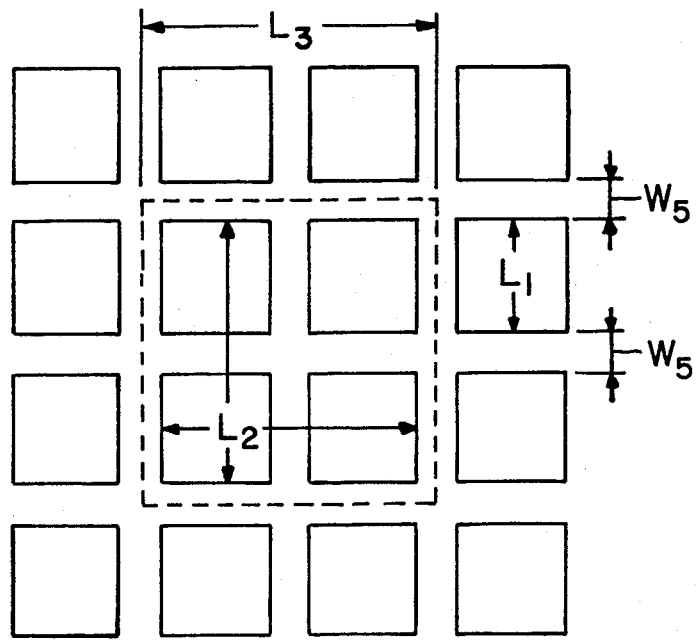
FIG. 17 is a partial schematic frontal view of the outlet face of a compound slot die of the present invention
Figure 18:
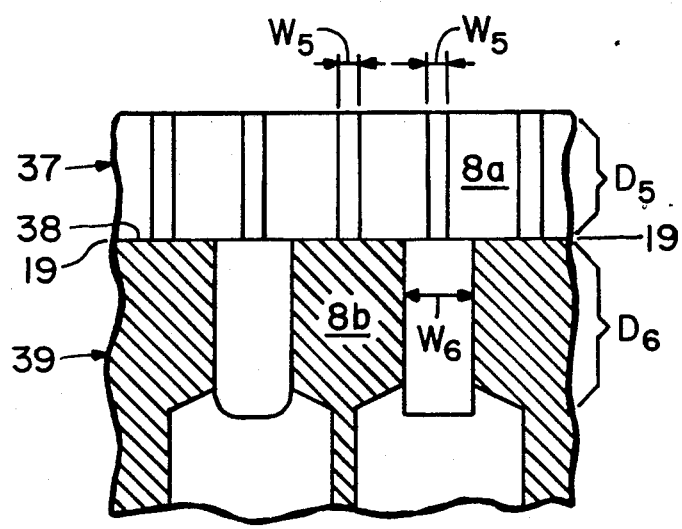
FIG. 18 is a partial cross-sectional view of the compound extrusion die of FIG. 17.

FIG. 17 shows a partial frontal view of the outlet face of the inventive die. All slots shown are part of zone 8a. Lhd 3 is the length of each side of the smallest repetitive unit in zone 8a. The batch feed mechanism feeds half of the slot width on the perimeter of the repetitive unit and all of the slot widths internal to the repetitive unit. Therefore, to calculate the volume in the terminal discharge slot zone 8a repetitive unit, the following equation is used:

Terminal discharge slot zone 8a
volume = $2L_1W_5D_5 + 2L_2W_5D_5 + L_3W_5D_5$ $L_2$ is the length of a whole portion of a secondary slot within the repetitive unit and $L_1$ is the length of a fractional portion of a secondary slot within the repetitive unit. $W_5$ is the width of the slot in the terminal discharge slot zone 8a. FIG. 18 shows the partial cross sectional of the die showing the depth of the terminal discharge slot zone 8a, $D_5$.

Figure 19:
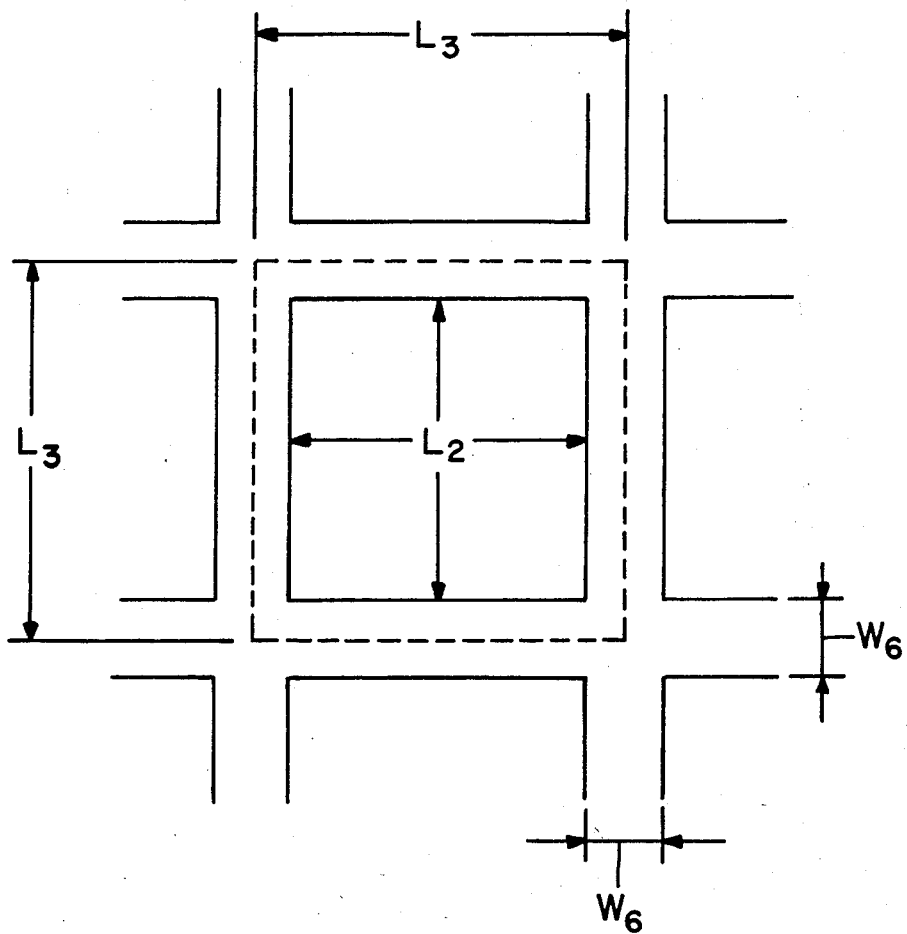
FIG. 19 is a partial frontal view of outlet face 38 in FIG. 18.

To show the volume segments associated with the intermediate discharge slot zone 8b a cut away of FIG. 18 was made at the transverse lateral intersection of zones 8a and 8b to reveal outlet surface 38 of block 39, which is shown in FIG. 19. The longest slot length within zone 8b of the repetitive unit is $L_3$ and the slot segment length along the width of the primary pin within zone 8b of the repetitive unit is $L_2$. The width of the slot is defined by $W_6$ and the depth, as shown in FIG. 18, is $D_6$. The volume equation for the intermediate discharge slot zone 8b is: $L_2W_6D_6 + L_3W_6D_2$. To calculate the slot zone volume ratio, zone 8a volume is divided by zone 8b volume or $$\text{Alternate Volume Ratio} = \frac{2L_1W_5D_5 + 2L_2W_5D_5 + L_3W_5D_5}{L_2W_6D_6 + L_3W_6D_6}$$

This zone volume equation makes it possible to compare volume ratios within a single die or between different dies. To characterize a volume ratio as producing structures which produce protrusions, higher cell density knitting or a combination thereof, empirical performance data is needed to relate a specific volume ratio value to the type of structure produced. Once a relationship between volume ratio and structure produced is established for a particular batch composition it is then possible to predict the type of structure that can be produced simply by knowing the volume ratio. In this manner, die manufacture can be more purposefully designed to be consistent with die needs.

The ratio of holes 7 in FIG. 2 to the total number of proportionally associated primary and secondary discharge slot segments can be determined from a smallest repetition unit of a die, such as the unit circumscribed in FIG. 10b by dotted line 36. Proportionally associated segment means: those segments of slots associated with each intersection of slots, which segments form the intersection and extend outwardly from the intersection proportionally to other segments of the slots extending outwardly from other intersections of the slots. For purposes of clarification reference to the schematic of FIG. 10b is helpful. Intersection 50 in FIG. 10b within repetitive unit 36 includes four proportionally associated segments. These segments form a cross extending from the center of intersection 50 to essentially the midpoint of the secondary pin. Each intersection 52 of repetitive unit 36 contains one full proportionally associated segment which extends from intersection 52 to the midpoint of the secondary pin ending at the point where the proportionally associated segment of intersection 50 begins. Additionally, each intersection 52 contains two half proportionally associated segments which extend midway to intersections 54. Therefore, each intersection 52 associated with repetitive unit 36 contains two proportionally associated segments. Since there are four intersection 52's within repetitive unit 36, intersection 52 accounts for eight proportionally associated segments within repetitive unit 36. In a similar analysis it can be determined that each intersection 54 of repetitive unit 36 contains two half proportionally associated segments, resulting in one proportionally associated segment, which begin at intersection 54 and end midway in the secondary pin where the proportionally associated segment of intersection 52 begins. There are four intersection 54's, therefore there are four proportionally associated segments related to intersection 54 within repetitive unit 36. The total of all proportionally associated segments within repetitive unit 36 is 16. Repetitive unit 36 overlays two one quarter portions of feed holes 7 which provide extrudate to repetitive unit 36. The ratio of feed holes to proportionally associated segments is $\frac{1}{2} \div 16 = 0.03125$.

Under the same analysis for a die without secondary slots only intersection 54 is available to receive extrudate. As discussed above, intersection 54 has one proportionally associated segment, therefore a similar repetitive unit without secondary slots contains four proportionally associated segments fed by two one quarter portions of feed holes. The ratio of feed holes to proportionally associated segments is therefore $\frac{1}{2} \div 4 = 0.125$.

Comparing dies with and without secondary slots clearly indicates that inclusion of secondary slots in a die results in a 75% decrease in the proportionally associated segment to feed hole ratio. If the die of FIGS. 10a–10b were to be modified to contain a hole feeding each intersection area at the four corners of unit 36, then the ratio of holes to proportionally associated slot segments for that modified die would be $1 \div 16 = 0.0625$, which also is a 75% decrease of the ratio that would otherwise exist in the absence of secondary slots. Thus, the present invention comprehends such ratio being less than 0.125 and advantageously less than 0.1 where at least some of the discharge slots communicate directly with the feed holes.

Each or some or alternate rows of the primary pins in dies of the present invention may be divided, as desired for a honeycomb structure wall configuration, by two or more secondary slots extending in at least one, in each of several or in each of all of the transverse directions of such secondary slots. One exemplary embodiment of this additional feature is shown in FIG. 11. This die contains crisscrossing secondary discharge slots 2 midway between adjacent crisscrossing primary discharge slots 3 (comparable to the die of FIGS. 1–3) and further contains additional crisscrossing secondary discharge slots 2A forming either square or other rectangular secondary pins 6. All of the slots have the same width. Slots 2A may be construed as tertiary slots if they otherwise have a depth (not shown) from the outlet face 1 that is shorter than that of the slots 2. In the latter case, the inner ends of the shorter slots 2A (not shown) may collectively be construed to define the end of a first layer of the terminal slot zone and the beginning of a second layer of the terminal slot zone (where the terminal slot zone begins at the boundary defined by the collective inner ends of only the longer secondary discharge slots 2), or alternatively, the inner ends of all slots 2 and 2A may collectively be construed as an undulate shaped boundary marking the end of the intermediate slot zone and the beginning of the terminal slot zone. Nevertheless, slots 2 and 2A are in direct transverse communication only with themselves and primary slots 3, whereby combined transverse and longitudinal flow of extrudable material occurs from slots 3 into slots 2 and 2A as well as between slots 2 and 2A. Where desired for producing different wall and/or protrusion thicknesses in the extruded product, slots 2 may be made narrower or wider than slots 2A.

Where the combined nature of the extrudable material and the specific dimensions of the die are such that fully knitted honeycomb structure walls are formed by some or all of the slots 2 and 2A, some of the material during flow into and along slots 2 and 2A from slots 3 will in part further flow (both transversely and longitudinally) from one to the other of slots 2 and 2A at their mutual intersections to so form either protrusions and/or fully knitted walls emerging at the outlet face 1 from the centermost segments of slots 2 and 2A dividing each square or otherwise rectangular primary pin 5.

FIGS. 11–15 illustrate a further feature that may be included within a die of the present invention. The inner ends of slots 2A in FIG. 11 are provided with enlarged extensions 31 constituting (preferably crisscrossing and interconnected) welling or pooling areas or reservoirs to help laterally feed extrudable material from slots 3 into the inner ends of slots 2A along their transverse extent. As desired, these reservoirs 31 may also be similarly provided (although not shown in FIG. 11) along the inner ends of slots 2 for essentially the same function. Also, reservoirs 31 may be provided (although not shown in FIG. 11) along the inner ends of primary slots 3 (which corresponds to the pooling areas 144,145 in FIGS. 19–20 or U.S. Pat. No. 3,038,201). While FIG. 11 shows a simple form of reservoirs 31 with transverse circular shape FIGS. 12–15 illustrate some improved shapes of the reservoirs. In FIG. 12, reservoirs 31A connected in both slots 2 and 3 have a substantially oval shape transverse to their length, which further facilitates lateral flow of extrudable material into all transverse portions of the inner ends of primary slots 3 from holes 7 and of secondary slots 2 from primary slots 3. FIG. 13 shows reservoirs 31B of transverse tear-drop shape to additionally facilitate combined transverse and longitudinal flow of extrudable material into all inner end portions of slots 2. While the tear-drop reservoirs 31B are relatively short, FIGS. 14 and 15 illustrate elongated tear-drop shaped reservoirs 31C and 31D respectively connected to primary slots 3 and secondary slots 2 for the same but enhanced function as that of reservoirs 31B. Thus, the variously shaped reservoirs can be usefully employed as crisscrossing and interconnected extensions of and on the inner ends of primary and/or secondary slots in dies of the present invention. Moreover, the novel tear-dropped shaped reservoirs can advantageously be so employed in dies not containing any crisscrossing secondary discharge slots.

Since reservoirs 31 (as well as 31A, 31B and 31D) are special inner end extensions of slots 2A (and 2), they are functionally part of the terminal slot zone 8a. Accordingly, the reservoirs 31 and the inner ends of slot 2 in FIG. 11 collectively form an undulate boundary 24A between the intermediate slot zone 8b and the terminal slot zone 8a.

The compound slot die of FIG. 16 is of the type shown in U.S. Pat. No. 4,354,820 by virtue of the fact that plate 37 is bonded to the outlet face 38 of block 39 after wide portions 3B of the primary slots have been formed in block 39 to directly communicate with holes 7. After plate 37 is so bonded, narrow portions 3A of the primary slots and secondary slots 2 are cut into plate 37 from the outlet face 1. The result is a die having primary slots with narrow outer portions 3A communicating at 11A with wide inner portions 3B. While secondary slots 2 are shown to have a depth shorter than the depth of portions 3A, slots 2 can as desired be made of equal depth to that of portions 3A. In either case, portions 3A and slots 2 can be construed as being in the terminal slot zone having an undulate collective boundary of their inner ends marking the end of the intermediate slot zone. The ends of slot portions 3B that overlap holes 7 can be flat or squared off as at 11 or rounded as at 11C or otherwise suitably contoured by suitable slot cutting apparatus.

The below examples are intended as expansive of the invention by way of exemplary variations and not intended as a limitation of the invention. Neither is a limit placed on the inclusion of additional layer(s) or terminal slot zone(s) resulting in a terminal multilayer feeding mechanism.

EXAMPLE 1

A used die was obtained and machined with the following dimensions. The primary discharge slot dimensions per slot were 0.053 inches (1.14 mm) in length $L_3$, 0.008 inches (0.20 mm) in width and 0.130 inches (3.302 mm) in depth. The secondary discharge slot dimensions were 0.0451 inches (1.15 mm) in length $L_2$, 0.008 inches 0.20 mm) in width, and 0.040 inches (1.02 mm) in depth. The resultant Volume Ratio was 3.83, and the ratio of the total number of feed holes to total number of proportionally associated discharge slot segments was 1 to 16. The resulting substrate exhibited the honeycomb structure with protrusions on the walls of each side of each unit cell as shown in FIG. 4.

EXAMPLE 2

A second die was machined using the EDM wire cutting process for cutting slots with the intermediate slot volume the same as in example 1. The secondary discharge slot dimensions per slot were the same as in example 1 except the depth was cut to 0.075 inches (1.91 mm). The resultant Volume Ratio was 2.07 and the ratio of the total number of the feed pathways to total number of proportionally associated discharge slot segments was 1 to 16. The ceramic substrate extruded through this die exhibited full knitting as exampled by unit cell 17 in FIG. 5. The full knitting produced by this die resulted in a 1600 per square inch ceramic substrate with four times the number of unit cells produced by the same die prior to machining the discharge slots.

EXAMPLE 3

The primary discharge slot dimensions per slot in this die were 0.043 inches (1.09 mm) long as $L_3$, 0.009 inches (0.23 mm) wide, and 0.112 inches (2.97 mm) deep. The secondary discharge slot dimensions per slot were 0.035 inches (1.09 mm) long as $L_2$, 0.009 inches 0.23 mm) wide, and 0.060 inches (1.52 mm) deep. The resultant Volume Ratio was 2.55. This die produced a ceramic substrate with a honeycomb structure with both protrusions and full knitting. The protrusions varied in size from smaller size protrusions to the larger protrusions 14 shown in FIG. 4. The full knitting in the substrate would have produced 2400 cells per square inch. Sample 5 produced results similar to this example.

EXAMPLE 4

The primary discharge slot dimensions per slot in this die were 0.075 inches (1.91 mm) long as $L_3$, 0.012 inches (0.30 mm) wide, and 0.180 inches (1.80 mm) in depth. The secondary discharge slot dimensions per slot were 0.057 inches (1.80 mm) long as $L_2$, 0.012 inches (0.30 mm) wide, and 0.109 inches (2.77 mm) in depth. The Volume Ratio was 1.58. The resulting ceramic substrate was fully knitted to 800 cells per square inch. Due to the increased width of the discharge slots in the terminal slot zone, the cell walls of the substrate were thicker.

EXAMPLE 5

The primary discharge slot dimensions per slot in the Example 5 die were 0.106 inches long as $L_3$ (2.69 mm), 0.008 inches wide (0.20 mm), and 0.127 inches (3.23 mm) in depth. The secondary discharge slot dimensions per slot were 0.098 inches long as $L_2$ (2.69 mm), 0.012 inches wide (0.30 mm) wide, and 0.05 inches (1.27 mm) in depth. The Volume Ratio was 2.12. The resulting ceramic substrate was fully knitted with cell walls alternating in wall thickness with a 400 cell per square inch cell density.

The results of these examples indicate that the Volume Ratio of the Primary Slot Volume to the Secondary Slot Volume is a significant parameter to design for the production of a substrate extruded through the inventive die. Both widths and depths may be varied to provide the desired ratios. Nowhere in the prior art is such a ratio considered significant to the extrusion die technology.

Examples, but not intended as limitations to the invention, of ceramic honeycomb structures with porous walls that may be produced by the novel die approach, are shown in FIG. 4 and FIG. 5. FIG. 4 shows a portion of a 400 cell per square inch honeycomb structure with a plurality of protrusions produced on the sides of the unit cell walls. This plurality of protrusions is produced during the extrusion of the ceramic honeycomb and is a result of a particular slots' volume ratio aspect of the new die configuration as described above. The protrusions are the result of incompletely formed unit cell walls which add a minimum of 5% surface area to the surface area of the protrusion connected unit cell wall.

FIG. 5 shows the result of effectively extending the plurality of protrusions so that the protrusions fully knit together to form additional complete walls within the former unit cell thereby quadrupling the number of unit cells and substantially doubling the wall surface area within a prior art unit cell that is formed only by primary slots. Additional honeycomb structure designs will mirror the designs represented in FIG. 6 and FIG. 7. FIG. 6 shows secondary slots 2A bisecting each 90° angle between intersecting primary slots 3, which produces the mirror image ceramic honeycomb structure with walls that bisect each 90° angle of each prior art unit cell wall (resulting from only primary slots) quadrupling thereby the number of unit cells over the prior art and producing unit cells of triangular transverse cross-section. FIG. 7 shows a triangular die configuration which produces the mirror image ceramic structure. The product of such a die is a triangular ceramic honeycomb structure with about two times the number of cell wall area and four times as many unit cells over the prior art unit cell formed by only the primary slots.

Machining the discharge slots may occur by plunge electrical discharge machining, electron beam milling, slitting saw cutting, or electrical discharge machining (EDM) wire cutting. The preferred machining technique is the EDM wire cutting process. The EDM process requires a machine tool apparatus with an electric hydraulic servo system and power unit which supplies a pulsating high frequency, DC current to the electrode. During the machining operation the electrode and workpiece are immersed in a dielectric which maintains a gap between the electrode and the workpiece. The gap or overcut depends on the operating voltage and current. The preferred method of the EDM process for cutting the discharge slots in the die workpiece is by an EDM wire with deionized water used as the dielectric. The size of the slot volume is defined by the size of the EDM wire, the voltage, the amperage, the width and depth of cut, and the cutting rate. A numerical control program based on the center distance was written and entered into the programmable Electrical Discharge Machine. The program controls the machine operation to insure the accuracy of slot cutting to within a few ten thousandths of an inch and to avoid bending or breaking either the primary or secondary core members. The die was then placed in an extrusion press and a ceramic body extruded through the die.

The secondary discharge slot can be cut into an existing used die or can be designed into a new die. Prior to the secondary discharge slot cut, the Volume Ratio between the Primary Slots' Volume and the Secondary Slots' Volume should be considered to produce the desired honeycomb substrate. The Volume Ratios of the Primary Slots' Volume to the Secondary Slots' Volume can determine whether protuberances, knitting of cell walls or a combination of both protrusions and knitting will be obtained. Table 1 is illustrative of the volume ratio relationship.

TABLE 1

Primary Slots' Volume to Secondary Slots' Volume

| Die Sample | Volume Ratio | Result |
|---|---|---|
| 1 | 3.83 | Protrusions |
| 2 | 2.07 | Knitted |
| 3 | 2.55 | Both 50% |
| 4 | 1.58 | Knitted |
| 5 | 2.12 | Knitted |

Table I indicates three knitted volume ratios which provide a range of relative volumes for the primary slots and secondary slots. Generally, when the Primary Slots' Volume to the Secondary Slots' Volume ratio is greater than 3.0, protrusions are formed; when less than 2.25, knitting occurs; and when between approximately 2.25 and 3.0, a mixture of protrusions and knitting occurs. At a Volume Ratio approaching 2.0, the limit of obtaining knitting or knitting and protrusions is reached when a mixture of clay, talc, and alumina is extruded. Since the Primary Slot Volume to the Secondary Slot Volume ratio can be determined prior to die cutting, a systematic arrangement with ratios of varying dimension can be incorporated into a single die unit. This systematic arrangement may be tailored to the needs of the exhaust stream or filterable material to produce a honeycomb substrate with both knitting and protrusions.

Table 2 shows the same data as that presented in Table 1 for purposes of illustrating the alternate way of calculating volume ratios.

TABLE 2

| Die Sample | Alternate Volume Ratio | Result |
|---|---|---|
| 1 | 1.67 | Protrusions |
| 2 | 4.16 | Knitted |
| 3 | 3.60 | Both 50% |
| 4 | 4.89 | Knitted |
| 5 | 5.71 | Knitted |

The Alternate Volume Ratios indicate that when the volumes of zone 8a is less than twice the volume of zone 8b protrusions result, when the Alternate Volume Ratio is greater than 4 or there is 4 times the volume in zone 8a as in zone 8b knitting results, and when the Alternate Volume Ratio is between 2 and 4 both protrusions and knitting result.

The change in the mechanism of flow through the extrusion die advances extrusion die technology. The prior art dies feed discharge slots directly from feed holes with a common minimum ratio of 1 feed hole for each 4 proportionally associated discharge slot segments between slot intersections and forming an intersection of slots. This technique relies heavily on the burdensome technology of machining feed holes. By the inventive mode herein presented as much as 75% fewer feed holes are required. In addition, the holes are larger and as a consequence are much easier to machine. Machining slots into dies is a much more controllably precise process. As above disclosed, slots may be machined to within a few ten thousandths of an inch of specified location and size. Machining primary discharge slots and secondary discharge slots results in a more precisely machined extrusion die capable of producing increased surface area honeycomb structures with a significantly decreased number of feed holes. The inventive extrusion die feeds secondary discharge slots transversely and longitudinally with and directly from primary discharge slots. The advantages of this phase of the mechanism of extrusion flow are the production of honeycomb structures with protrusions, increased unit cells per square inch, or both protrusions and increased cells per square inch. The additional change in the extrusion die flow mechanism is that the feed holes longitudinally and transversely feed primary discharge slots but do not directly communicate with the secondary discharge slots. The advantage of this phase of the mechanism is a decreased number of feed holes to be machined per number of proportionally associated slot segments. The decreased number of feed holes of somewhat larger diameter then heretofore decreases batch flow impedance and reduces die manufacturing costs. It is the combined transverse and longitudinal feed of interconnected primary discharge slots by the feed holes and the primary discharge slots transversely and longitudinally feeding secondary discharge slots which provide the enhanced economics of the inventive die.

It is further contemplated that the mechanism of extruding batch flow material is enhanced by the addition of welling or reservoir volumes 31. FIG. 11 shows the placement of the additional volume areas within the interior of the die body at the end portion of the secondary discharge slots 2A within the terminal slot zone 8a and at the boundary 24A with the intermediate slot zone 8b. The addition of the welling or reservoir volume 31 increases the residence time of batch flow material within the secondary discharge slots 2A to insure filling the entire slots volumes.

The addition of the welling or reservoir volume 31 increases the available flow of batch material in the interior portion of the die body. The increased interior batch flow may be then channeled into the secondary slots 2 herein disclosed or may be channeled into additional secondary slots 2A machined into the outlet face of the die. FIG. 11 shows the addition of discharge slots 2A which may be also fed by the secondary discharge slots 2 as well as with the added welling or reservoir volume 31. It is further contemplated that additional slots may be fashioned into the face to form additional cell walls and/or protrusions. The limit of discharge slots which may be added to the outlet face of the novel die is the limit of extrudable material, based on its viscosity and particle sizing, which may be delivered to the slots as well as the ability to machine the die face with slots and simultaneously maintain the integrity and strength of the plurality of core members or pins required to define said discharge slots.

We claim:

1. An extrusion die for forming honeycomb structures with intersecting cell walls from extrudable material, which comprises a die body having an inlet face and an outlet face, a plurality of feed holes extending within the body from the inlet face toward the outlet face, the feed holes directly communicating only with each of a plurality of transversely crisscrossed primary discharge slots defined by a plurality of primary core members of the body and extending within the body from the outlet face toward the inlet face, with inner end portions of the feed holes communicating longitudinally and transversely in overlapping manner with inner end portions of the primary discharge slots, and characterized by the improvement comprising secondary discharge slots extending within the primary core members from the outlet face toward the inlet face and into direct transverse communication with the primary discharge slots, the secondary discharge slots dividing the primary core members into secondary core members defining the secondary discharge slots, said secondary discharge slots not directly communicating with said feed holes and the inner ends of at least some of the secondary discharge slots being provided with enlarged extensions constituting feed reservoirs extending along and communicating with said inner ends.

2. An extrusion die as defined in claim 11 wherein the reservoirs are crisscrossing with and interconnected to each other.

3. An extrusion die as defined in claim 1 wherein the reservoirs have a transverse circular shape.

4. An extrusion die as defined in claim 1 wherein the reservoirs have a transverse oval shape.

5. An extrusion die as defined in claim 1 wherein the reservoirs have a transverse tear-drop shape.

* * * * *

UNITED STATES PATENT AND TRADEMARK OFFICE
CERTIFICATE OF CORRECTION

PATENT NO. : 4,902,216

DATED : February 20, 1990

INVENTOR(S) : George M. Cunningham, Rodney I. Frost, Irwin M. Lachman

It is certified that error appears in the above-identified patent and that said Letters Patent is hereby corrected as shown below:

Col. 5, line 21, "particles" should be "particle"

Col. 6, line 33, there should be a "." after "tion"

Col. 8, line 45, there should be a "," after "However"

Col. 8, line 57, take out "," after "$P_4$"

Col. 9, line 25, ":" should ";"

Col. 9, line 61, "Lhd 3" should be "$L_3$"

Col. 10, line 20, "$L_3W_6D_2$" should be "$L_3W_6D_6$"

Col. 11, line 13, "+" should be "$\div$"

Col. 11, line 21, "+" should be "$\div$"

Col. 12, line 29, there should be a "," after "shape"

UNITED STATES PATENT AND TRADEMARK OFFICE
CERTIFICATE OF CORRECTION

PATENT NO. : 4,902,216

DATED : February 20, 1990

INVENTOR(S) : George M. Cunningham, Rodney I. Frost, Irwin M. Lachman

It is certified that error appears in the above-identified patent and that said Letters Patent is hereby corrected as shown below:

Col. 13, line 53, there should be a "(" before "0.023"

Col. 18, line 17, "11" should be "1"

Signed and Sealed this

Twelfth Day of January, 1993

Attest:

DOUGLAS B. COMER

*Attesting Officer*    Acting Commissioner of Patents and Trademarks